July 11, 1933.  C. STERN  1,918,145

LUBRICATOR SUPPLY TANK

Filed Oct. 24, 1932  3 Sheets-Sheet 1

Inventor
Charles Stern
By Mawhinney & Mawhinney,
Attorneys.

July 11, 1933.  C. STERN  1,918,145
LUBRICATOR SUPPLY TANK
Filed Oct. 24, 1932   3 Sheets-Sheet 2

Inventor
Charles Stern
By Mawhinney & Mawhinney,
Attorneys

July 11, 1933.  C. STERN  1,918,145
LUBRICATOR SUPPLY TANK
Filed Oct. 24, 1932    3 Sheets-Sheet 3
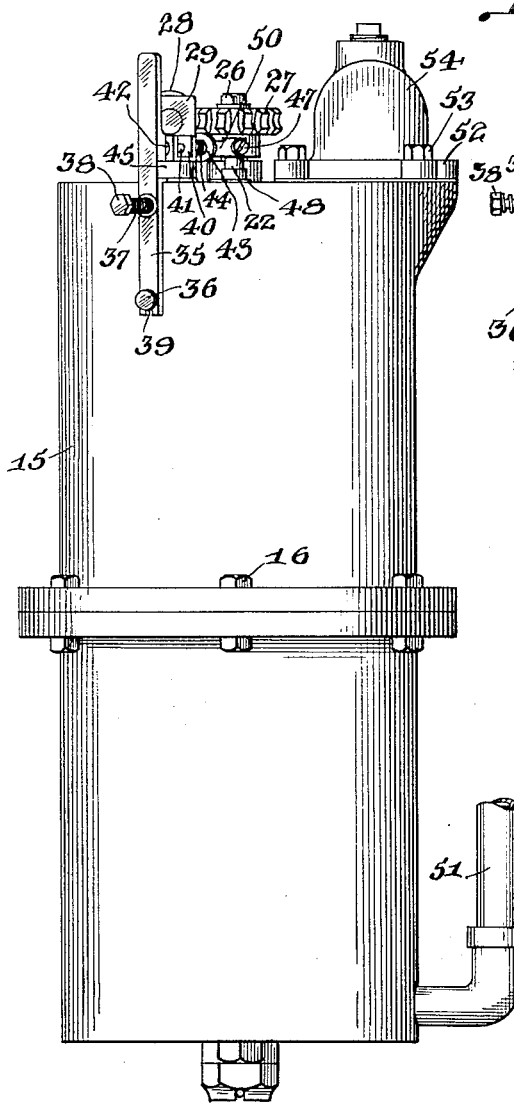
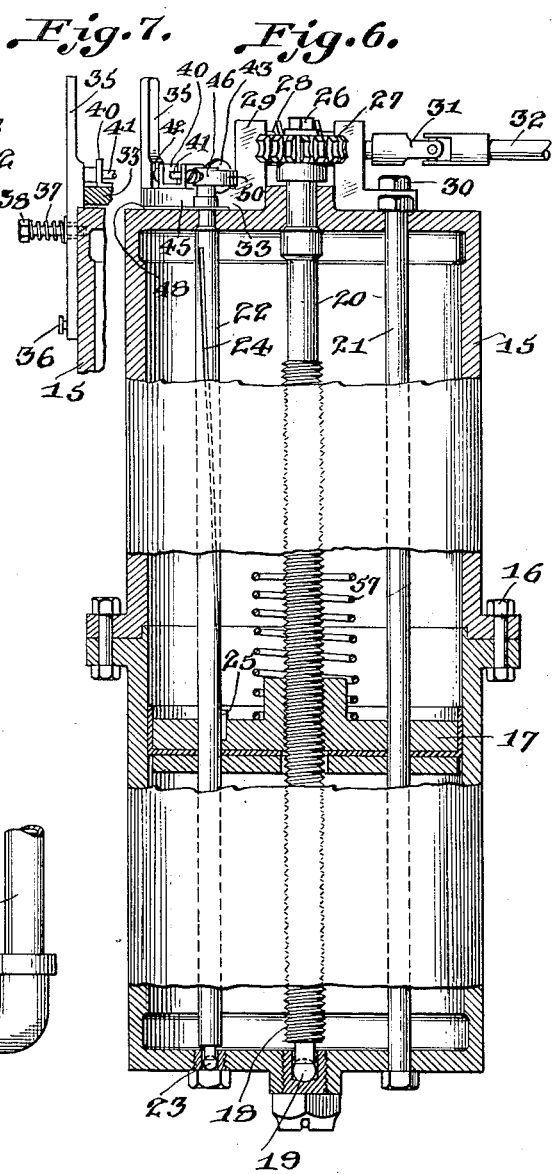
Inventor
Charles Stern
By Mawhinney & Mawhinney,
Attorneys.

Patented July 11, 1933

1,918,145

UNITED STATES PATENT OFFICE

CHARLES STERN, OF JERSEY CITY, NEW JERSEY, ASSIGNOR TO ARDCO MANUFACTURING COMPANY, OF HOBOKEN, NEW JERSEY, A CORPORATION OF DELAWARE

LUBRICATOR SUPPLY TANK

Application filed October 24, 1932. Serial No. 639,376.

The present invention relates to a lubricator supply tank adapted for use in connection particularly with a rail and flange lubricator of the type disclosed in application Serial No. 585,568 filed January 8, 1932.

An object of the present invention is to provide a lubricant supply tank with a follower construction for positively feeding the lubricant from the tank proportionately to the advancement of the follower and which is equipped with a combined indicator and throw-out device for disclosing at the exterior of the tank the quantity of lubricant contained therein, and for throwing the follower mechanism out of engagement when the supply of lubricant in the tank becomes exhausted.

The invention also aims at the provision of a tank having a follower therein with means for advancing the follower lengthwise within the tank to eject the lubricant from the tank, and to provide the tank with a combined gauge shaft and guide rod for the follower to hold the latter from turning and for turning the shaft by movement of the follower so that the shaft may be connected to a gauge and throw-out device for operating the same in timed relation to the advancement of the follower.

A further object of the invention is to provide a worm and worm-wheel drive for the follower in a lubricator tank for actuating the follower and wherein the worm is mounted on a movable bracket and the follower connected to a throw-out device having an arm, and wherein the bracket carries a spring pressed pin adapted to be moved by the arm to trip a latch and release the bracket whereby the spring of the pin may react against the arm to shift the bracket into position with the worm disengaged from the wormwheel.

A still further object of the invention is to provide an improved construction wherein the latch is utilized for taking up the throwout operation of the spring pressed pin and for latching or holding the worm carrying bracket in thrown-out position.

With the foregoing and other objects in view, the invention will be more fully described hereinafter, and will be more particularly pointed out in the claims appended hereto.

In the drawings, wherein like symbols refer to like or corresponding parts throughout the several views.

Figure 5 is a side elevation of the lubricator supply tank showing the parts in normal interlocked position.

Figure 6 is a vertical section taken through the tank substantially on the line 6—6 of Figure 1 and with the parts interlocked, and Figure 7 is a detail fragmentary view of an upper rim portion of the tank, showing the latch and adjacent parts, substantially on the line 7—7 of Figure 1.

Figure 1:
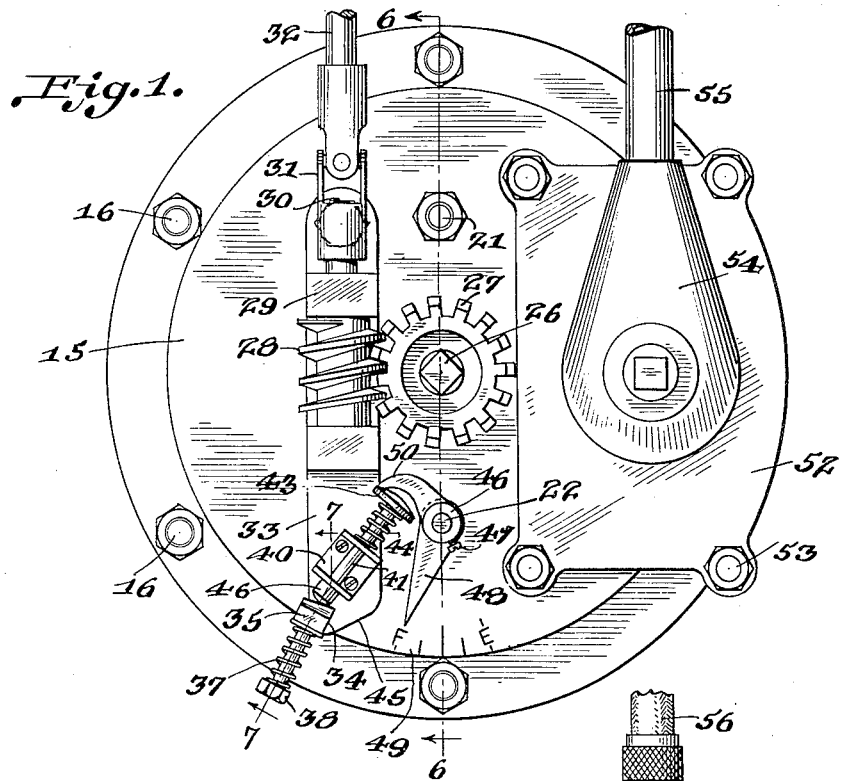
Figure 1 is a top plan view of a lubricator supply tank equipped with the operating mechanism of the present invention and wherein the drive elements are in interlocked position with the tank substantially filled.

Referring now to the drawings, and first to Figure 6, the supply tank 15 may be of any suitable depth or length, is preferably cylindrical, and may be made in two opposed parts coupled together by abutting flanges and a row of spaced bolts 16. The tank 15 is provided with a follower 17 of any suitable construction and which at its central portion is threaded upon a threaded shaft 18 which at its lower end may be mounted in a thrust bearing 19 provided in the bottom of the tank 15, and which at its upper end has bearing through the top of the tank 15 as shown. The shaft 18 is provided with an unthreaded portion 20 near its upper end and within the tank 15 adapted to be traversed by the hub of the follower 17 when the latter rises to the top of the tank so that the threads of the follower and the shaft, as well as other parts of the device, will not be injured by accidental forcing of the shaft 18 when the tank is empty.

To hold the follower 17 from turning so that it may be properly advanced lengthwise in the tank 15, guide members 21 and 22 are provided. The guide member 21 may be in the form of a shaft or rod which is secured through the opposite ends of the tank and which passes eccentrically through the follower 17.

The guide member 22, however, is in the form of a shaft adapted to rotate and is mounted at its lower end in a thrust bearing 23 and at its upper end has bearing through the top of the tank 15. The shaft 22 is adapted to turn through an opening provided in the follower at one side of the shaft 18, and the shaft 22 is provided with a spiral groove 24 adapted to receive therein a key 25 carried by the follower in the opening so that as the follower traverses the shaft 22 the latter is rotated at a relative speed determined by the pitch of the spiral groove 24.

The shaft 18 is provided on its upper extremity, above the tank 15, with a wrench receiving head 26 of any suitable shape or configuration for receiving a wrench, a crank or any other suitable tool by means of which the shaft 18 may be quickly and directly turned. On top of the tank, the shaft 18 carries a worm wheel 27 which meshes with a worm 28. The worm 28 is journalled at opposite ends in a bracket 29 which is pivoted at one end 30. The worm 28 is connected by a universal joint, or the like, 31 with a drive shaft 32 adapted to be intermittently or otherwise operated in order to turn the worm 28 and actuate the follower 17 through the worm-wheel 27 and the shaft 18. The universal joint 31 is located in proximity to the pivotal support 30 of the worm bracket so that the bracket may be swung about its pivot 30 without interrupting the operation of the shaft 32.

The bracket 29 is provided at its outer end with an arm 33 which extends to the outer edge of the tank 15 and is provided at its outer end with a recessed shoulder 34 at the outer corner of the bracket remote from the worm-wheel 27. A latch 35 is pivotally mounted at 36 against the side of the tank and extends upwardly therefrom and is adapted to engage against the shoulder 34 for holding the bracket positively from swinging outwardly on its pivot 30 and with the worm 28 intermeshing with the worm-wheel 27. The latch 35 is yieldingly held in this position by means of a spring 37 carried upon a bolt 38 which passes freely through the intermediate portion of the latch 35 and is secured in the side of the tank 15, as shown to advantage in Figure 7. The pivot 36 of the latch is a loose one and may be formed by a notch 39 in the lower end of the latch 35 which is adapted to engage downwardly over the pivot 36 so that the latch 35 is free to rock upon the bolt 38 when the upper end of the latch is moved outwardly. The bolt 38 has a loose fit through the intermediate portion of the latch so that the latter may be swung out of engagement with the shoulder 38 against the tension of the spring 37.

Figure 2:
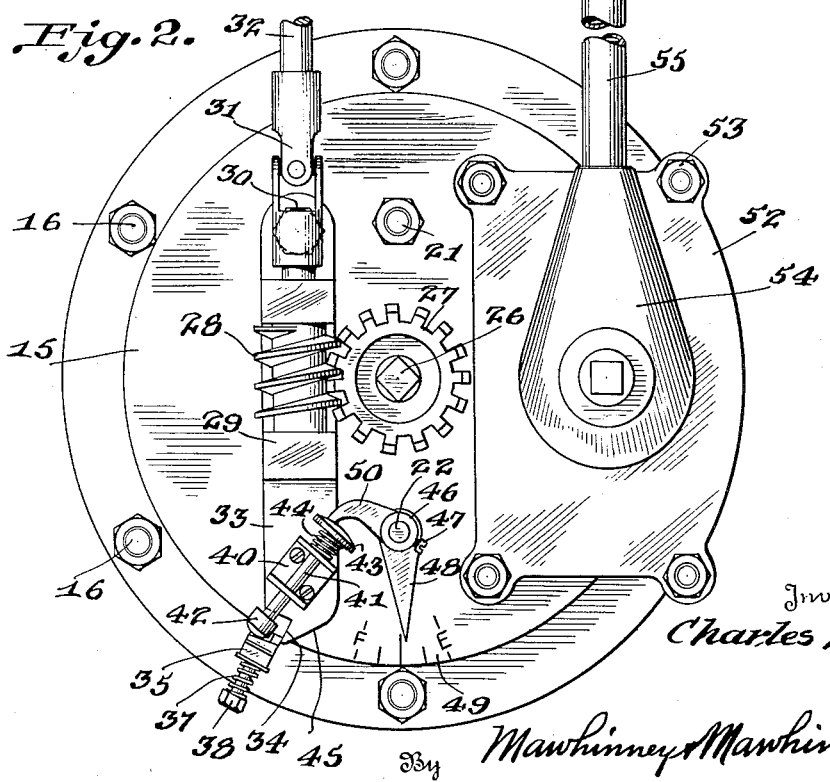
Figure 2 is a similar view showing the tank partially emptied and with the latch releasing and ejecting means placed under tension ready for release of the drive elements.

The arm 33 of the worm bracket carries a pin holder 40 at its upper side in which is slidably mounted a trip pin 41 having an enlargement 42 at its outer end adapted to engage the inner side of the latch 35, as shown in Figures 1 and 2.

Figure 3:
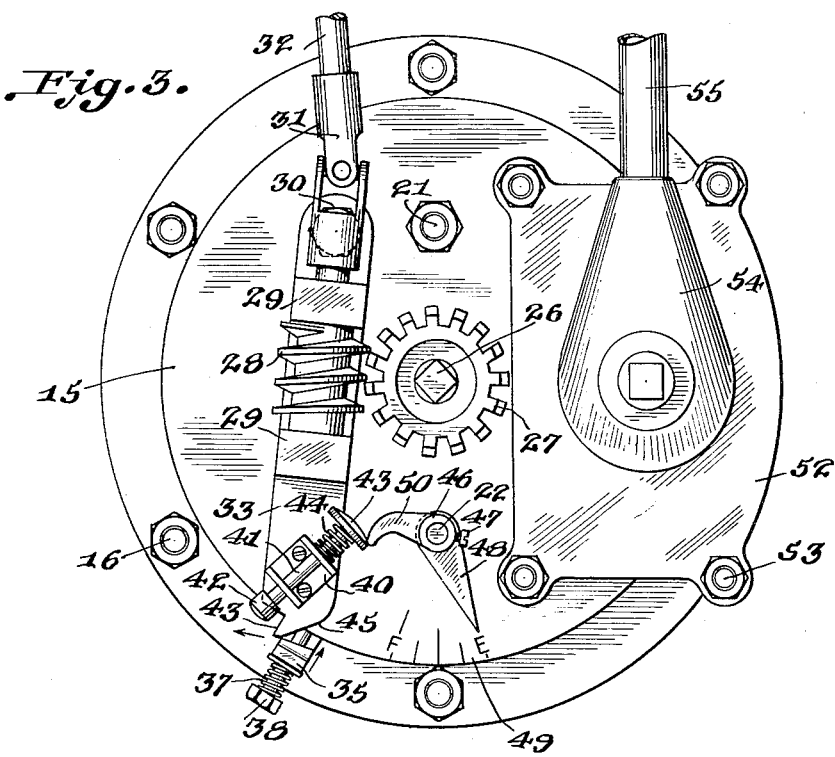
Figure 3 is a like view showing the indicator in position when the tank is empty and wherein the spring pressed pin has tripped the latch and partially thrown out the worm bracket, and wherein the retaining latch has started to take up the further ejection of the worm bracket.
Figure 4:
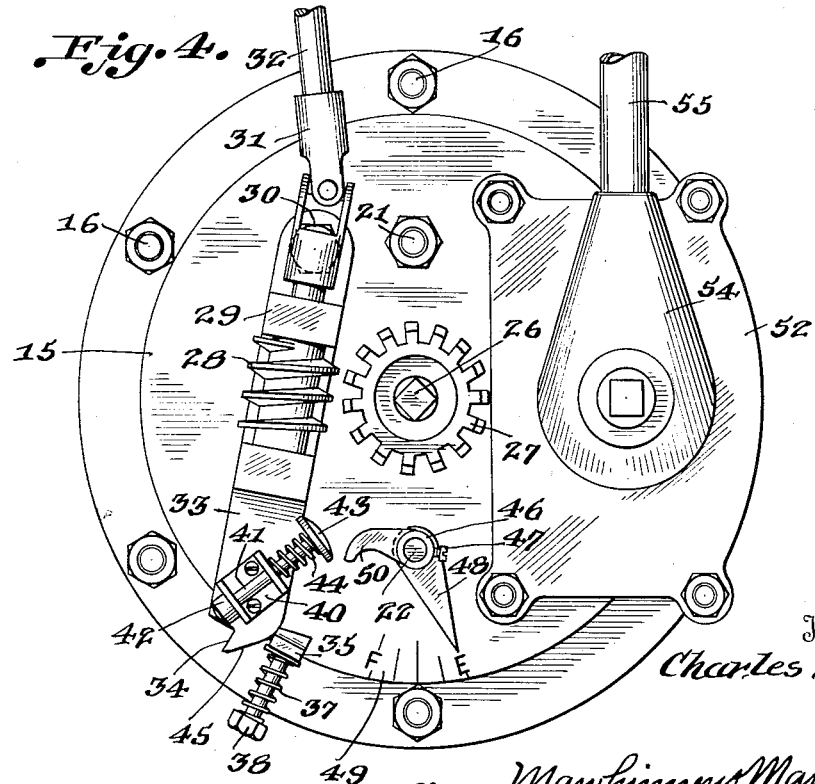
Figure 4 is a like view showing the worm bracket in fully released position and with the latch holding the same from returning to normal position.

The inner end of the pin 41 has an enlarged head 43 and carries a spring 44 disposed between the head and the holder 40 for normally urging the pin 41 in the retracted position away from the latch 35, as shown in Figure 4. The outer end of the arm 33 is provided with an inclined or cam face 45 which extends from the outer edge of the shoulder 34 inwardly and backwardly to the inner edge of the arm. This cam face 45 is adapted to be engaged by the latch 35 after the latch has been released and the bracket 29 swung into a partially released position, as shown in Figure 3. The spring 37 of the latch is adapted to urge the latter inwardly against the cam face 45 and to thus further spring the bracket 29 outwardly from the worm-wheel 27. The latch 35 is adapted to drop back into normal position and against the inner side of the arm 33, as shown in Figure 4 to hold the bracket 29 in released position and from accidentally moving the worm 28 into engagement with the worm-wheel 27.

The pin 41 is tripped by any suitable means, such as through the operation of the combined guide and gauge shaft 22. The shaft 22 projects upwardly through the tank 15 and has a hub or sleeve 46 secured thereto by means of a set screw 47 or the like.

The shaft 22 carries an index finger 48 which may project substantially radially outward over the upper end of the tank and when turned is adapted to traverse a scale or index 49 adapted to show when the tank is full and when it is empty, and also to show various quantities of the lubricant remaining in the tank. The hub 46 carries a trip arm 50 which extends across the head 43 of the trip pin when in normal position, shown in Figure 1 and which is adapted to engage the head and to bear thereagainst to shift the pin 41 outwardly as the pointer or finger 48 traverses the index 49 from the full toward the empty position.

As the follower 17 rises in the tank, the lubricant is forced upwardly against the top of the tank and, as shown in Figure 5, a vent pipe 51 may be connected to the lower end of the tank and carried upwardly to any desired height depending upon the location of the tank. The top of the tank is provided with a removable cover plate 52 detachably held in place by bolts 53 and which carries an elbow 54 of preferably conical shape for receiving the grease from the tank and directing it laterally into a pipe 55 connected to the small end of the elbow 54 and which may be coupled to a flexible hose 56, or the like, for carrying off the lubricant under pressure.

To fill the tank it is only necessary to remove the plate 52, when empty condition of the tank is indicated by the finger 48. If the tank has not been entirely emptied and it is desired to refill the tank, the operator may grasp the upper end of the latch 35 and force it outwardly against the tension of the spring 37, and the bracket 29 may be manually swung outwardly to disengage the follower operating mechanism. The shaft 18 may now be manually or otherwise directly turned to lower the follower 17 into normal position at the lower end of the tank.

When the tank is full and in position for operation, the parts assume the positions shown in Figure 1. Here the indicator finger 48 shows that the tank is full. The trip pin 41 is retracted to its fullest extent by its spring 44 as the pin 41 is relieved from pressure by the arm 50. The latch 35 is interlocked with the shoulder 34 so that the bracket 29 is securely held against swinging on its pivot 30 and consequently the worm 28 is held in intermeshing engagement with the worm-wheel 27. Turning of the shaft 32 rotates, through the universal connection or joint 31, the worm 28 which is proportioned to the worm-wheel 27 for actuating the latter at a relatively slow rate of speed.

The worm-wheel 27 turns the shaft 18 which turns its threaded portion through the threaded portion of the follower 17 and gradually and slowly feeds the follower upwardly within the tank 15. The follower 17 raises the body of grease toward the top of the tank and forces the grease or other lubricant into the elbow 54 and out through the pipe 55 and hose 56.

As the contents of the tank is used, the follower 17 rises and consequently rotates the shaft 22 which in turn moves the index finger 48 over the index so as to show from the top of the tank the amount of lubricant still remaining. During this movement of the index finger 48, the arm 50 is advanced against the head 43 of the trip pin and is caused to gradually project the pin outwardly through its holder and against the latch 35. This position of the parts is shown in Figure 2.

When the tank is empty, the index finger 48 is disposed at the end of the index 49, as shown in Figure 3, and the pin 41 has been advanced by the finger 50 against the latch 35 a distance sufficient to move the latch beyond the shoulder 34. When the shoulder 34 is released from the latch, the bracket 29 with its arm 33 is free to swing on the pivot 30.

When the shoulder 34 passes the latch 35, the spring 37 of the latch forces the latter inwardly with sufficient pressure to slide the cam face 45 of the bracket against the latch and move the bracket to the outer side of the latch so that the latch may drop in behind the bracket and lock it open as shown in Figure 4.

Thus when the tank is empty the worm 28 has been automatically disengaged from worm-wheel 27, which prevents any further turning of shaft 18 and movement of follower 17 upward, eliminating any possibility of damage to tank or its mechanism. However, should arm or finger 50 or pin 41 or any part of the automatic unit break or fail, shaft 18 is provided with an unthreaded portion at its upper end, which allows follower 17 to run off threaded part of shaft 18. The follower 17 may be provided with a spring 57 at its upper side adapted to engage the underside of the top of the tank 50 and to normally urge the follower downwardly so that when the shaft 18 is turned backwardly to lower the follower the latter will be quickly engaged with the threads of the shaft.

The spiral groove 24 in the rotatable guide shaft 22 and the key 25 may, of course, be interchanged or substituted by any suitable device capable of causing rotation of the shaft 22 by travel of the follower 17 in the tank.

As the shaft 22 carries the index finger 48, the trip arm 50 may be adjusted by means of its hub 46 and set screw 47 relatively to the index finger 48 so as to trip the pin 41 when the desired amount of lubricant has been delivered from the tank 15.

The tank 15 has been described in reference to a vertical position, but it is, of course, understood that the tank may be mounted in a horizontal or other angular position than as shown in the present drawings because the throw-out mechanism is under spring control and no part of the device relies upon gravity for its operation.

It is obvious that various changes and modifications may be made in the details of construction and design of the above specifically described embodiment of this invention without departing from the spirit thereof, such changes and modifications being restricted only by the scope of the following claims.

What is claimed is:

1. In a lubricator, a container for lubricant, a threaded shaft mounted in the container, a follower threaded on said shaft in the container, guide members mounted in the container and engaging the follower to hold the same from turning on the shaft, one of said guide members mounted for rotation in the container, turning means disposed between said rotatable guide member and the follower for turning the guide member upon longitudinal movement of the follower, trip means mounted on said rotatable guide member, an operating shaft, and a separable connection between said operating and threaded shafts and having a portion disposed in the path of said trip member for separating the connection when the trip member is turned into a predetermined position.

2. In a lubricator, a container for lubricant, a follower in the container, a threaded shaft in the container engaging the follower to move the same, a guide member rotatably mounted in the container and engaging through the follower, turning means disposed between the follower and the guide member for turning the latter when the follower is moved, a combined indicator and trip member mounted on said guide member at the top of the container, an operating shaft, a bracket pivotally mounted on the container and supporting one end of the operating shaft, intermeshing gear members carried on the operating shaft on the bracket and on the threaded shaft in the container, a latch carried by the container for holding said bracket in position to intermesh said gear members, and a trip pin carried by the bracket and lying between said latch and said combined indicator and trip member for releasing the latch when the trip member is moved to a predetermined position.

3. In a lubricator, a container for lubricant, a follower in the container, a threaded shaft mounted in the container and engaging the follower to move the same, a gear on the upper end of the shaft, a guide member mounted in the container and engaging through the follower and having a spiral sliding connection therewith for turning the guide member upon movement of the follower, an operating shaft, a bracket pivoted upon the container supporting the end of the shaft, a gear member carried by the bracket and connected to the operating shaft, a latch mounted on the container for normally engaging the bracket to hold the gear member against the gear to drive the threaded shaft, a trip arm mounted on said guiding member, and a spring pressed pin slidably mounted on said bracket and disposed between said latch and said trip member for movement by the latter to release the latch from said bracket, said spring pressed pin adapted to swing said bracket into gear releasing position when said latch is released.

4. In a lubricator, a container for lubricant, a follower in the container, a threaded shaft for the follower, a longitudinal guide member mounted in the container having spiral connection with the follower for turning the guide member upon movement of the follower, a trip finger mounted on the upper end of said guide member, a bracket movably mounted on the container, an operating shaft connected to the bracket and having a gear member in the bracket, a second gear member mounted on the threaded shaft, a latch carried by the container for engaging the bracket to hold the gear members together for advancing the piston by the operating shaft, a spring pressed pin carried by the bracket and normaly disposed between the latch and the trip finger for operation by the latter to release the latch from the bracket, said pin adapted to react when said latch is released to force the bracket into open position and release said gear members, a spring for said latch normally urging the same into closed position, the outer end of said bracket having a cam face for engagement by said latch to further move said bracket into gear releasing position, said latch adapted to retain said bracket in releasing position.

5. In a lubricator, a container for lubricant, a follower in the container, a threaded shaft in the container for operating the follower, a guide member rotatably mounted in the container and having a spiral connection with the follower, a trip finger on the upper end of the guide member, a worm on the upper end of said shaft, a bracket pivoted at one end upon the container, an operating shaft mounted in the bracket and having a worm, a spring pressed latch mounted on the container for engaging the bracket to hold the latter in closed position with said worm intermeshing with the worm-wheel, a holder mounted on the bracket, a pin slidably mounted through the holder and disposed with one end adjacent the latch and the other end adjacent the trip finger, a spring carried by the pin and engaging the holder to normally retract the pin through the holder toward the trip finger, said finger adapted to depress said pin against the tension of said spring and release said latch whereby reaction of the spring may swing said bracket into open position and release the worm from the worm-wheel, said bracket having a cam face at its outer end for engagement by said latch to swing the bracket into further open position upon the return of the latch, said latch adapted to hold the bracket in open position.

6. In a lubricator supply tank, a threaded shaft disposed lengthwise in the tank, a piston follower in the tank in threaded engagement with said shaft, means for automatically turning the shaft in one direction, a pair of guide rods disposed lengthwise in the tank and extending through the piston follower to hold the latter from turning, one of said rods being mounted for rotation in the tank and having a spiral groove therein, an indicator mounted on the end of said rod, and a key on the piston engaging in the spiral groove on said rod for turning the rod proportionately to the movement of the piston back and forth in the cylinder.

In testimony whereof I affix my signature.

CHARLES STERN.